United States Patent [19]

Pappas

[11] 3,999,907
[45] Dec. 28, 1976

[54] ADJUSTABLE TIRE RETREAD CURING MATRIX

[76] Inventor: Constantine G. Pappas, 410 San Lucas Drive, Solana Beach, Calif. 92075

[22] Filed: Apr. 5, 1976

[21] Appl. No.: 674,040

[52] U.S. Cl. .................................. 425/20; 425/47; 425/28 D; 425/46; 425/39

[51] Int. Cl.[2] ........................ B29H 5/04; B29H 5/08

[58] Field of Search .............. 425/17, 20, 22, 46, 425/47, 32, 36, 39, 40, DIG. 19, 23, 28 D; 249/191, 219 W, 189

[56] References Cited

UNITED STATES PATENTS

| 1,482,325 | 1/1924 | Shively | 425/40 X |
|---|---|---|---|
| 1,634,047 | 6/1927 | Smith | 425/DIG. 19 |
| 1,984,768 | 12/1934 | Shook | 425/DIG. 19 |
| 2,030,861 | 2/1936 | Fisher | 425/22 |
| 2,372,217 | 3/1945 | MacMillan | 425/20 |
| 2,567,985 | 9/1951 | Baker et al. | 425/23 |
| 2,898,659 | 8/1959 | Shoemaker | 249/219 W X |
| 3,056,183 | 10/1962 | Pigeot | 425/DIG. 19 |
| 3,137,909 | 6/1964 | Bonin et al. | 425/191 |
| 3,158,089 | 11/1964 | Fillol | 425/DIG. 19 |
| 3,460,197 | 8/1969 | Cantarutti et al. | 425/46 |
| 3,609,819 | 10/1971 | Searle | 425/47 |
| 3,704,082 | 11/1972 | Hottle | 425/46 |

*Primary Examiner*—J. Howard Flint, Jr.
*Attorney, Agent, or Firm*—Harris, Kern, Wallen & Tinsley

[57] ABSTRACT

An adjustable tire curing mold or matrix suitable for retreading tires of varying diameter. A plurality of rigid mold segments with adjacent segments joined to form a continuous annular mold of variable diameter, and means for compressing the mold segments inwardly about a tire positioned within the mold.

17 Claims, 17 Drawing Figures

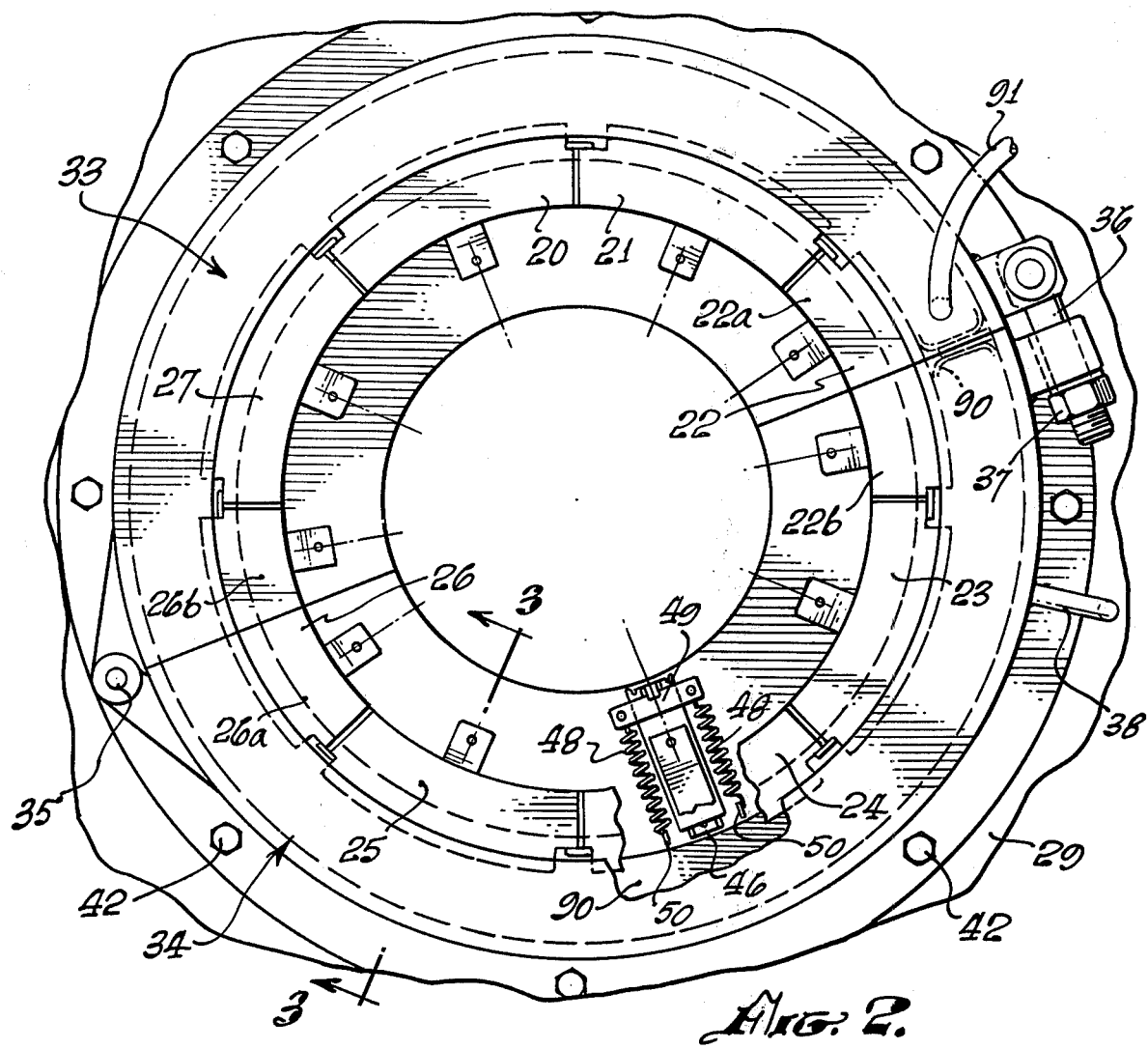
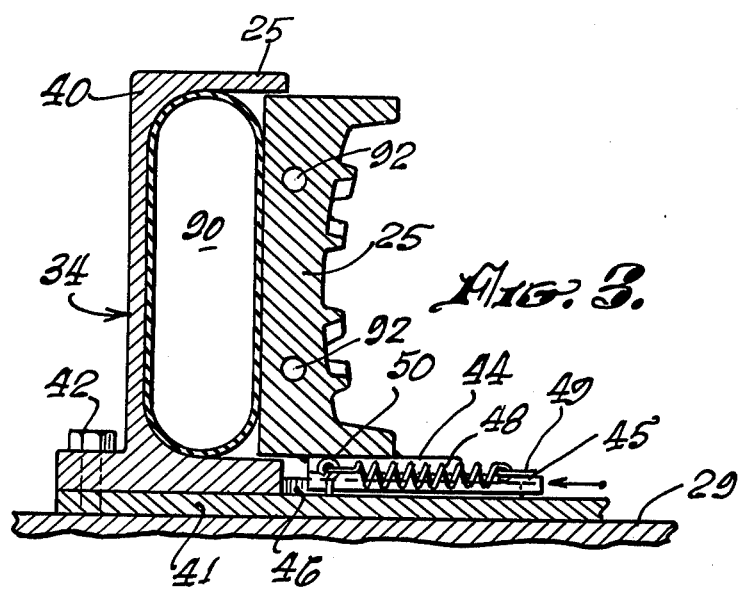

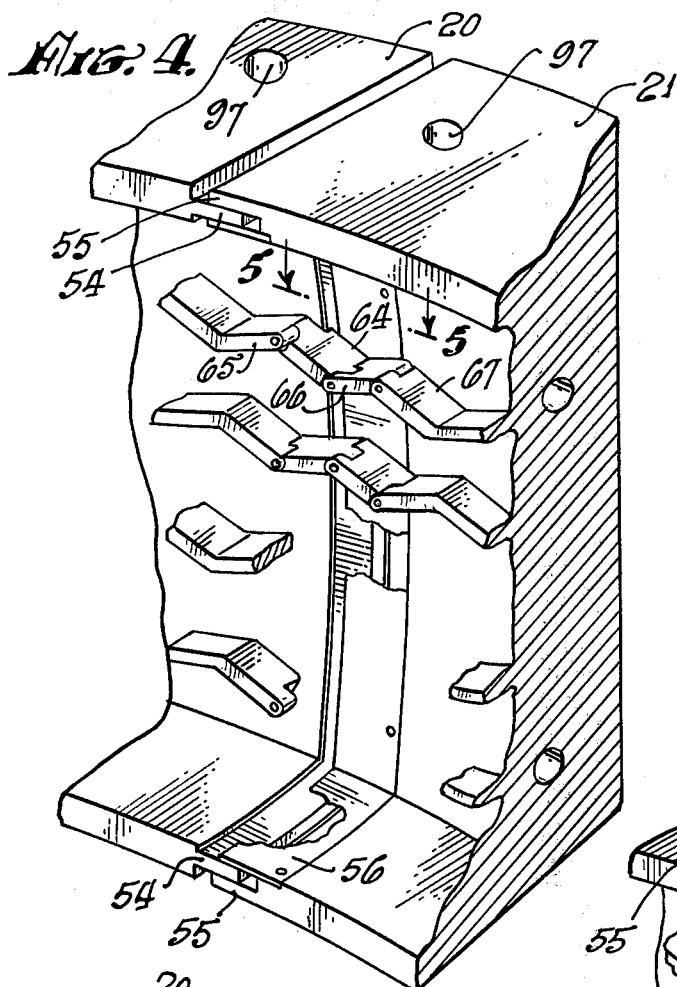
FIG. 4.
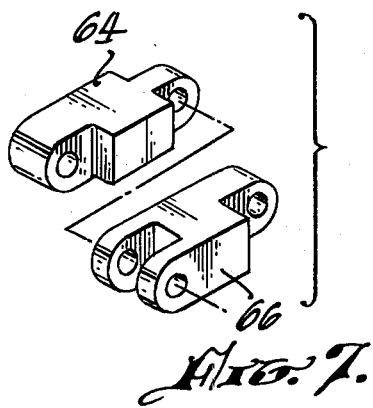
FIG. 7.
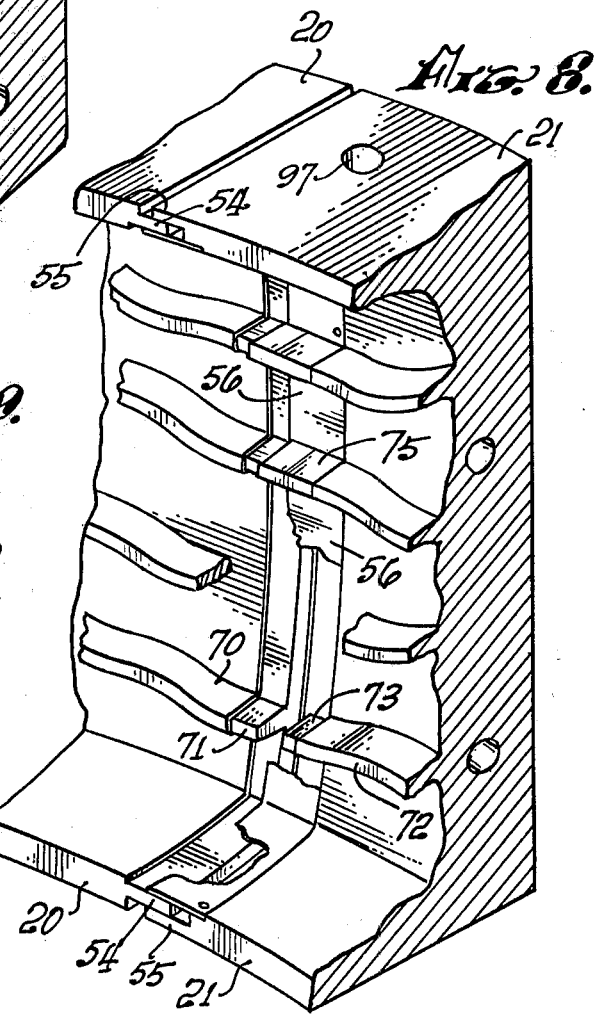
FIG. 8.
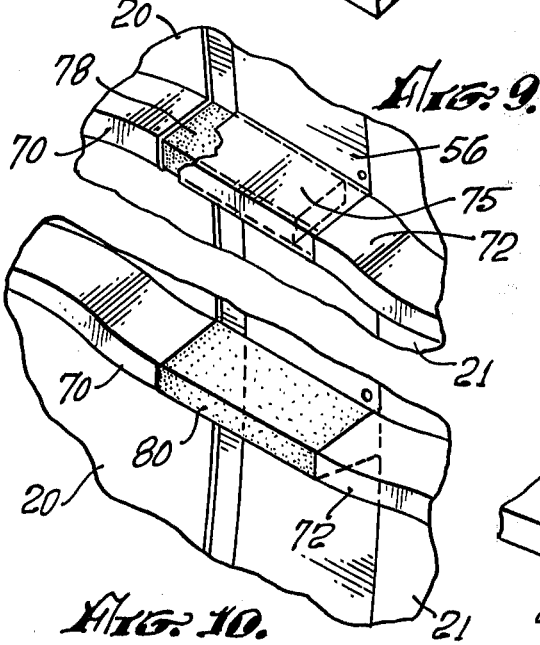
FIG. 9.
FIG. 10.

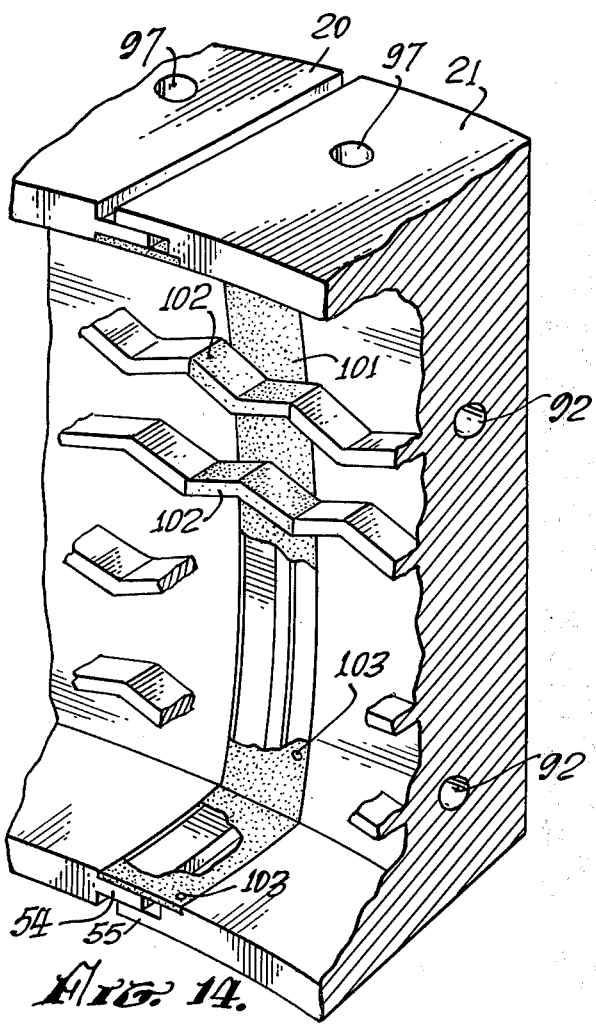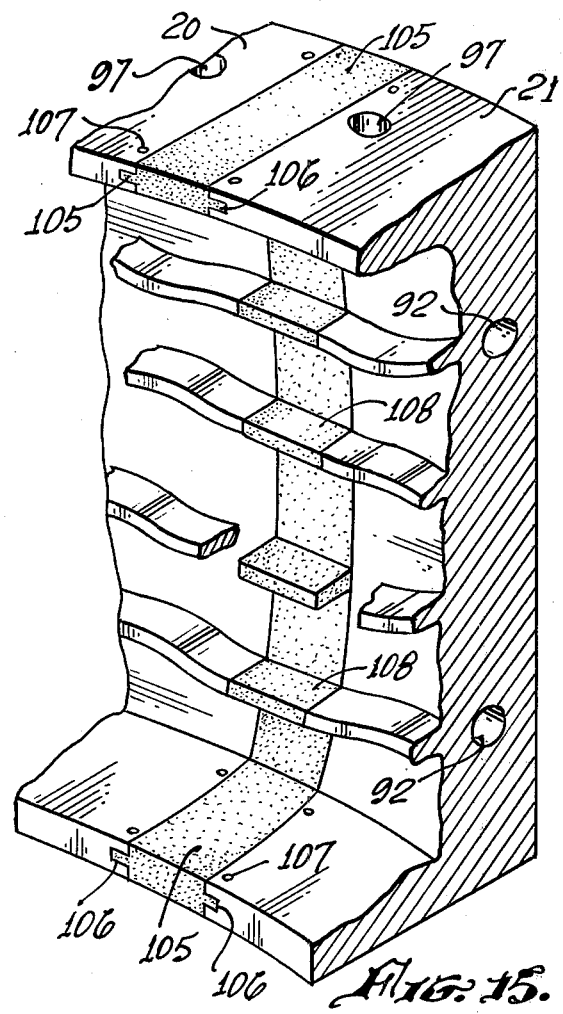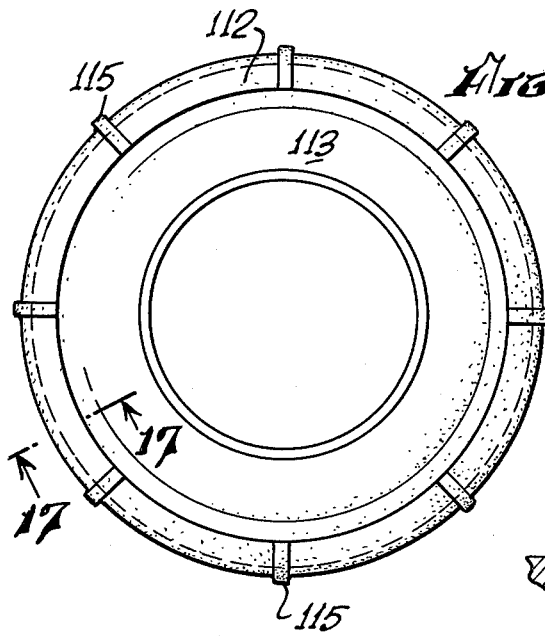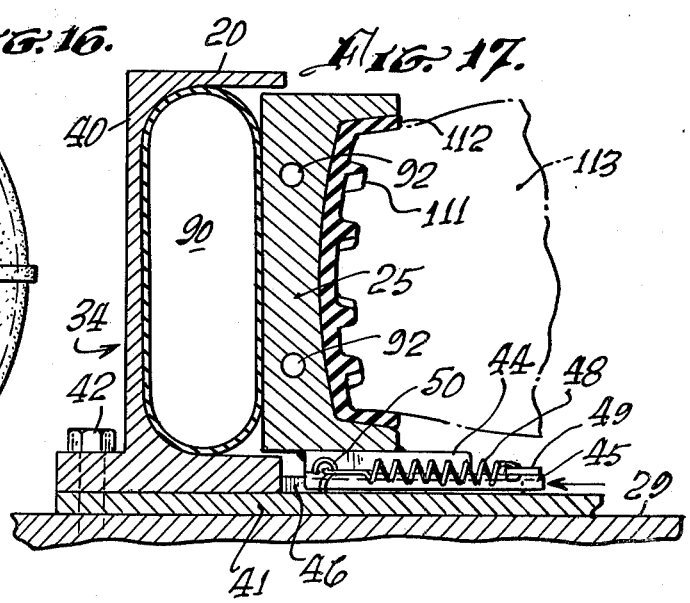

ADJUSTABLE TIRE RETREAD CURING MATRIX

BACKGROUND OF THE INVENTION

This invention relates to tire curing molds or matrices and in particular, to a new and improved adjustable mold particularly suited for use in retreading operations.

The general operation for producing a tire includes placing the tread material on the periphery of the casing, positioning the tire in a mold, and applying heat to cure the tread material, bonding the tread to the casing and forming the desired pattern.

Two types of molds are in general use today. One type uses two rigid annular sections, an upper section and a lower section which are joined together with the tire therebetween. In the other type, a plurality of rigid segments are brought into abutting engagement with each other to form the mold about the tire. A wide variety of mechanisms, both simple and complex, are in use for manipulating the mold pieces and the tire. All of these provide a fixed diameter for the mold.

In a different mode of operation, tires are also retreaded by utilizing a pre-cured tread rubber which is provided to the tire retreader in long strips. A piece of the cured tread rubber is cut to length and applied to the tire casing and is then vulcanized in place in a curing envelope. No curing mold is used with this type of operation. The pre-cured tread material is expensive.

Another approach to tire retreading is shown in the U.S. Pat. No. 2,014,010. In this arrangement, the retread material is positioned on the casing and a flexible band carrying the desired mold pattern is stretched over the retread material, with steam or air under pressure acting on the exterior of the non uniform band for pressing the mold into the uncured rubber. This assembly is then subjected to heat for vulcanizing the retread material in place. This system never became practical because of poor heat transfer characteristics and because the unsupported band had a very short life.

Tires of the same nominal size actually vary considerably in diameter, typically over a range of ± ½ of an inch outside diameter. When such tires are being retreaded in the presently used molds, either the two piece upper and lower mold or the multi segment mold, the tire is deformed to the fixed diameter of the rigid mold. This is not satisfactory because the tire is not cured in its most favorable condition unless it happens to exactly fit the mold with the beads in the same position they will be in when the tire is mounted on its rim. Tires that are cured in other than their optimum position do not perform as well as properly cured tires. Tires that are distorted when cured will run hotter, having an increased chance of failure and will not deliver the same wear as the tire cured in a mold of the precise size of the tire. One solution for this problem has been to have two or three molds of slightly different diameter available for use with each nominal tire size. However this requires a substantial increase in the initial cost of the equipment. Also, where automatic machinery is being utilized, a substantial amount of time and labor is required for changing molds.

The problem has become more serious in recent years with the advent of the radial tire, since the diameter of the radial tire is not readily reduced to fit a mold in the same manner as is the case with the bias tire. That is, a retread for a radial tire must be cured at a diameter very closely related to the belt diameter of the particular tire being handled.

It is an object of the present invention to provide a new and improved tire curing mold which has the advantages of the presently used rigid molds, while being adjustable for handling tires of varying diameter. A further object is to provide such an adjustable mold which can maintain tread continuity and which can have the heat transfer characteristics and long life of the conventional rigid mold of fixed diameter. Other objects, advantages, features and results will more fully appear in the course of the following description.

SUMMARY OF THE INVENTION

The present invention provides an adjustable tire curing mold having a plurality of rigid mold segments joined to form a continuous annular mold having a variable diameter which diameter can be controlled by the tire which is positioned within the mold. Various configurations for interengagement between the tire segments are shown. Heat and pressure may be applied to the mold by various methods, including those presently used in tire manufacture and tire retreading.

BRIEF DESCRIPTION OF THE DRAWINGS

FIG. 2 is a top view, partly in section, of the mold of FIG. 1;

FIG. 3 is an enlarged partial sectional view taken along the line 3—3 of FIG. 2;

FIG. 4 is a perspective view illustrating one embodiment of the segment interengaging means;

FIG. 7 is a perspective view of a pair of links from the embodiment of FIG. 4;

FIGS. 8, 9 and 10 are views similar to that of FIG. 4 showing alternative embodiments;

FIGS. 14 and 15 are views similar to FIG. 4 showing other alternative embodiments of the segment interengaging means;

FIG. 16 is a top view of a tire with an alternative form of tread forming elements; and FIG. 17 is a partial sectional view taken along the line 17—17 of FIG. 16.

DESCRIPTION OF THE PREFERRED EMBODIMENTS

Figure 1:
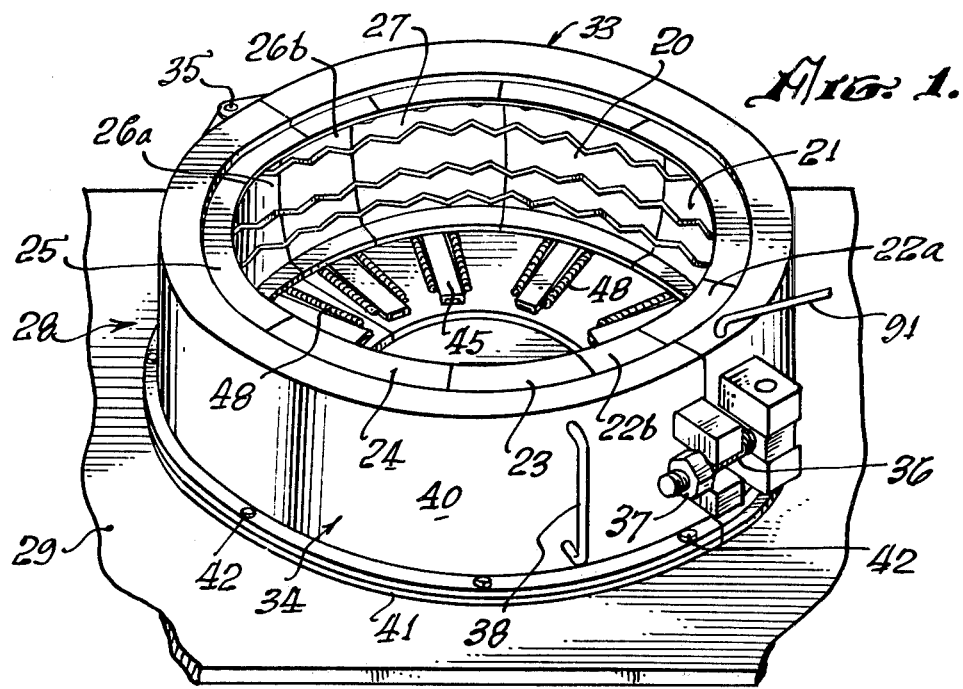
FIG. 1 is a perspective view illustrating an adjustable tire curing mold incorporating the presently preferred embodiment of the invention.
Figures 5, 6:
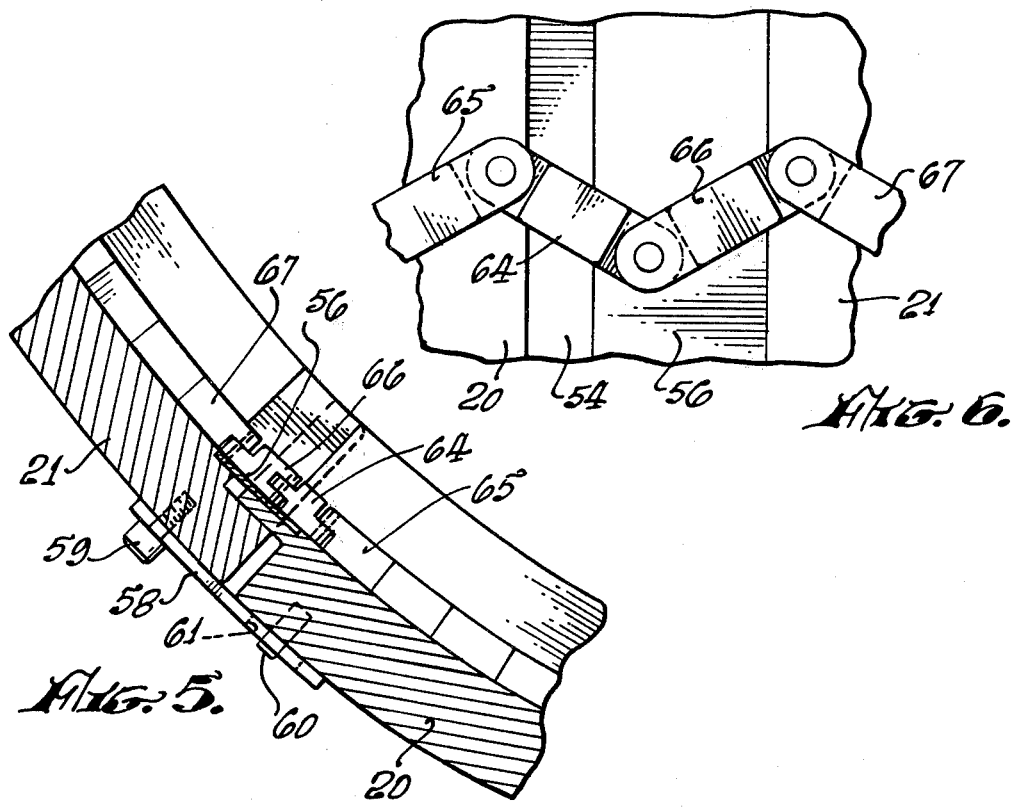
FIG. 5 is a sectional view taken along the line 5—5 of FIG. 4.
FIG. 6 is an enlarged view of a portion of the interengaging means of FIG. 4.
Figure 11:
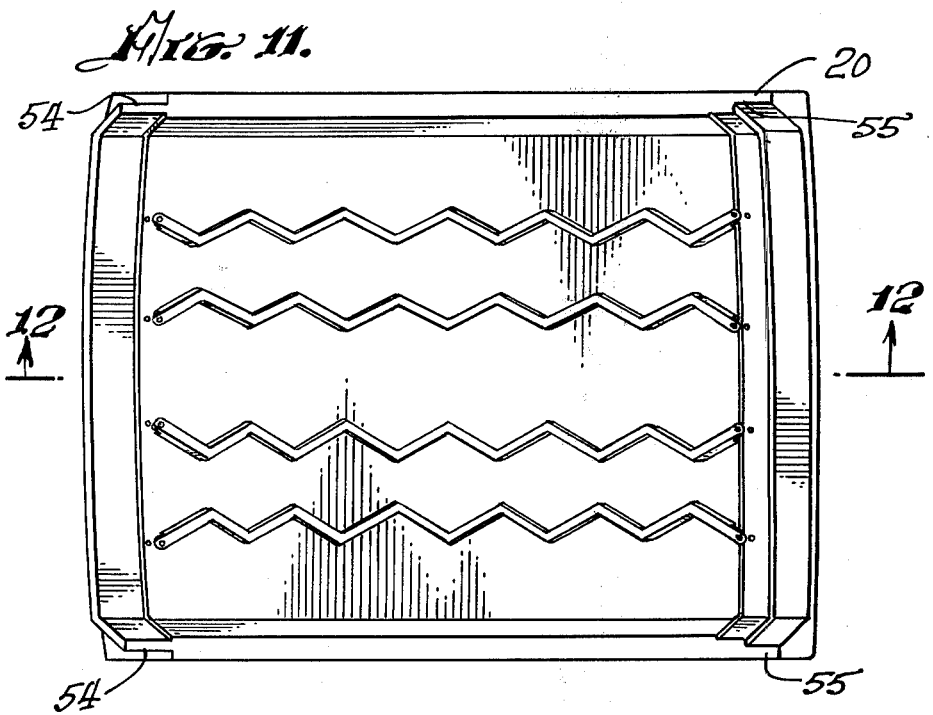
FIG. 11 is an inside view of a mold segment.

In the preferred embodiment illustrated in FIGS. 1 and 2, a plurality of tire tread mold segments 20—27 is positioned within a housing 28 resting on a support table 29. While eight mold segments are illustrated, it will be realized that the invention is not limited to this specific number of segments. The mold segments may be manufactured in the conventional manner, typically aluminum or steel cast with appropriate design, vapor relief openings, and heating passages. If desired, the mold segments may be divided into upper and lower halves.

The mold sections 22 and 26 are each divided into two abutting portions 22a, 22b and 26a, 26b permitting opening of the housing for inserting and removing a tire. The housing 28 is divided into two sections 33, 34 pivoted at a pin 35, with a pivoted latch 36 and lock nut 37. A handle 38 on the housing section 34 provides for pivoting the section 34 relative to the section 33 when the clamping mechanism 36, 37 is disengaged.

The housing sections 33, 34 may be the same, and a cross-section through the section 34 is shown in FIG. 3. An arcuate channel number 40 is fixed to a base plate 41 by bolts 42. The mold section 25 is mounted on a plate 44 which in turn is mounted on a sliding channel 45. The channel 45 moves radially on a guide 46 which is fixed to the base plate 41. A pair of springs 48 are positioned between a cross bar 49 on the channel 45 and eyes 50 projecting upward from the base plate 41. Similar slide arrangements are provided for the other mold segments, with the springs urging the mold segments outward so that the mold formed by the segments normally is at its greatest diameter facilitating insertion and removal of tires.

The mold of the present invention has a variable diameter, that is, the segments forming the mold may move radially, preferably in some form of guide, varying the distance between the segments and therefore varying the diameter of the mold. Means are provided for bridging the variable width gap between the segments and several embodiments are illustrated herein. An interengaging means at the gap between the segments 20, 21 is illustrated in FIGS. 4–7. Overlapping projections 54, 55 are provided at the edges of the segments 20, 21, respectively, permitting movement of the segment 21 toward and away from the segment 20. A sheet metal cover 56 may be affixed to the inner surface of the segment 21 adjacent the projection 55 for closing the space between the projection 54 and the segment 21. A guideplate 58 may be attached to the segment 21 by a screw 59, with a pin 60 in the segment 20 riding in a slot 61 of the guideplate 58. Similar construction may be used at the gaps between the other mold segments.

Means may be utilized for providing tread continuity at the variable width junction between adjacent mold segments. In the embodiment of FIGS. 4–7, a first link 64 is pivotally mounted to a fixed tread forming element 65 in the segment 20, and a second link 66 is pivotally mounted to a fixed tread forming element 67 in the mold 21, with the two links pivotally joined together. This construction permits movement of the segment 21 toward and away from the segment 20, as the segments move radially, while maintaining the tread forming structure continuous between the segments.

In a simpler construction, tread forming elements in the gap may be omitted. In some types of threads, such as those utilizing transverse lugs, this configuration may be preferred.

In the alternative embodiment of FIG. 8, the fixed tread forming element 70 of the segment 20 may have a projection 71, and the fixed tread forming element 72 of the segment 21 may have a similar projection 73. The gap between the projections 71, 73 is closed by a channel shaped section 75 which may be a portion of the cover plate 56. In another alternative embodiment, FIG 9, a compressible element 78 may be positioned between the fixed elements 70, 72 and held in place by the portion 75 of the cover 56, with the element 78 being compressed by the abutting portions 70, 72. In another embodiment, FIG. 10, an elastic member 80 is fixed to the elements 70, 72, with the member 80 stretching and compressing as the mold segments move away from and toward each other.

Another alternative form for the means between the mold segments is shown in FIG. 14. A unit 101 is molded of an elastomer, typically a butyl, having the shape of the plate 56 and links 64, 66. The tread forming elements 102 may have the same pattern as the tread forming elements in adjacent mold segments and abut against them, with the unit 101 and elements 102 being compressed when the mold segments move toward each other. The unit 101 may be held in place by pins or screws 103 or may be bonded in place.

Another alternative construction is shown in FIG. 15. Here the overlapping projections 54, 55 at the edges of the mold segments are omitted. A unitary molded unit 105 fits in the gap between the mold segments and may be provided with tongues 106 fitting in mating grooves in the mold segments and held in place by pins 107. The tread forming elements 108 are molded integral with the unit 105, with the unit being stretched and compressed as the mold segments move away from and toward each other, respectively.

Another alternative configuration is shown in FIGS. 16 and 17. In this embodiment, tread elements 111 are carried on the inner surface of an elastomer band 112 which may be positioned about the tire 113 before the tire is placed in the mold. In one form, the overlapping projections 54, 55 may be utilized to substantially fill the gaps between the mold segments. In another form, the projections 54, 55 may be omitted, and lugs 115 may be provided on the band 112 for fitting in the gaps and reinforcing the band at the gaps. For this embodiment, there will be no tread forming elements on the inner faces of the mold segments. However the mold segments provide the support for the band, apply the compressive force which forces the tread forming elements into the uncured rubber, and control the diameter, as in the earlier described embodiments. FIG. 2 shows the mold segments 22 and 26 divided into two abutting components permitting opening and closing of the mold. This separation is convenient but not essential and the gaps between the mold segments may be used for opening and closing. This is particularly suitable when using the band 112 of FIG. 16 with the lugs 115 with no sliding or overlapping parts at the gap.

It is necessary to apply heat and pressure to the mold segments during the curing operation, and many of the mechanisms presently in use are readily adapted to the present invention. Automatic curing presses with segmented molds are presently in use and are satisfactory for the present invention. In another configuration, individual hydraulic or pneumatic rams may be utilized for moving the individual mold segments. In another alternative, an inflatable tube may be positioned about the segments, with the pressure of the fluid in the tube being variable to control the compression force on the mold segments. A presently preferred embodiment for the compression system is shown in FIGS. 2 and 3. An elongate inflatable tube 90 is positioned in the channels 40 of the housing sections 33, 34, with the tube ends abutting each other where the two housing sections separate adjacent the connectors 36, 37. A fluid under pressure is connected to the tube via a line 91.

Figure 12:
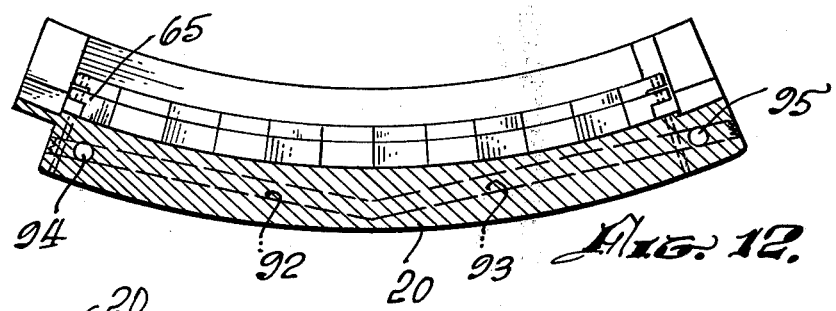
FIG. 12 is a sectional view taken along the line 12—12 of FIG. 11.
Figure 13:
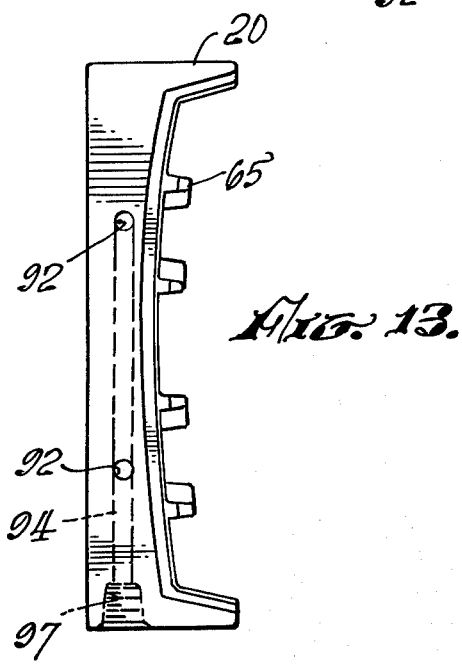
FIG. 13 is an end view of the mold segment of FIG. 11.

Flow passages for steam or other heating fluid may be provided in the mold segments and typically may comprise horizontal passages 92, 93 and vertical passages 94, 95 (FIGS. 12 and 13), with the outer ends of the passages 92, 93 plugged permitting steam flow lines to be connected at the tapped openings 97. Heat may also be applied by utilizing steam as the fluid in the tube 90.

In operation, the housing is opened and the tire mounted on a suitable rim is positioned in the mold and the housing is closed. The tire is inflated to about the normal use pressure. A compression force is then applied to the mold segments to force the segments into the uncured rubber of the tire. At the same time, an equal and opposite force is applied to the inflated tire by increasing the air pressure within the tire, to avoid deforming the tire. The two opposing forces are gradually increased until the desired curing pressure is reached. The unit is heated to the desired temperature for the desired time. After curing, the tire is deflated and the pressure on the mold segments is removed, the housing is opened and the cured tire is removed.

In an alternative mode of operation the desired diameter for the specific tire being handled may be determined, with the mold segments maintained at this size during curing. The tire is mounted on the rim, positioned in the mold and inflated, typically to one half the curing pressure. The compression force is applied to the mold segments to force them inward to the desired position and into the uncured rubber. The mold segments may be maintained in the position during curing, with the tire inflated to the desired curing pressure and with the desired curing temperature maintained for the desired time.

We claim:

1. In an adjustable tire curing mold, the combination of:
   a plurality of rigid mold segments with adjacent segments having segment interengaging means forming a continuous annular mold both circumferentially and across the tire tread face and of variable diameter and fixed width for positioning around a tire; and
   compression means for urging said segments inward about a tire positioned in the mold.

2. An adjustable tire curing mold as defined in claim 1 wherein said interengaging means includes opposed overlapping projections on adjacent segments in sliding engagement with each other.

3. An adjustable tire curing mold as defined in claim 2 including a flange on one segment cooperating with the projection thereof defining a groove for slidingly receiving the projection of the adjacent segment.

4. An adjustable tire curing mold as defined in claim 1 wherein said interengaging means includes variable width tire tread forming means providing continuity of a tread groove.

5. An adjustable tire curing mold as defined in claim 4 wherein said variable width tire forming means includes first and second links pivotally joined together and to tire tread forming elements in said segments.

6. An adjustable tire curing mold as defined in claim 4 wherein said variable width tire tread forming means includes opposed ridges on adjacent segments with a gap therebetween, and a cover carried on one of the segments enclosing the ends of said ridges and said gap.

7. An adjustable tire curing mold as defined in claim 4 wherein said variable width tire tread forming means includes retainer means carried on one of the segments defining an opening between the tire tread forming elements of the segments, and a compressible member positioned in said opening between said tire tread forming element.

8. An adjustable tire curing mold as defined in claim 4 wherein said variable width tire tread forming means includes an elastic member connected between the ends of tire tread forming elements in the adjacent segments.

9. An adjustable tire curing mold as defined in claim 1 including:
   a base plate having a plurality of radial guides;
   means for mounting a mold segment on a guide; and
   means for moving a mold segment along a guide.

10. An adjustable tire curing mold as defined in claim 9 wherein said base plate is in two sections, each carrying a plurality of mold segments, with means for moving one section away from the other section for insertion and removal of a tire.

11. An adjustable tire curing mold as defined in claim 9 including spring means interconnecting a mold segment and said base plate urging the mold segment radially outward against the urging of said compression means.

12. An adjustable tire curing mold as defined in claim 1 wherein said compression means includes:
    a rigid housing about said segments;
    an expandable bag between said housing and said segments; and
    means for introducing a fluid under pressure into said bag.

13. An adjustable tire curing mold as defined in claim 1 wherein said interengaging means includes:
    opposed overlapping projections on adjacent segments in sliding engagement with each other; and
    a unitary elastomer flange on one segment cooperating with the projection thereof defining a groove for slidingly receiving the projection of the adjacent segment and incorporating tire tread forming means providing continuity of a tread groove.

14. An adjustable tire curing mold as defined in claim 1 wherein said interengaging means includes a unitary elastomer member positioned in the gap between adjacent segments.

15. An adjustable tire curing mold as defined in claim 14 wherein said unitary elastomer member incorporates tire tread forming means providing continuity of a tread groove.

16. An adjustable tire curing mold as defined in claim 1 wherein said interengaging means includes an elastomer band for positioning about a tire and having tire tread forming means on the inner surface thereof, with the outer surface thereof engaging the inner surface of said segments.

17. An adjustable tire curing mold as defined in claim 16 wherein said band includes a plurality of lugs projecting outwardly into the gaps between said segments.

* * * * *

UNITED STATES PATENT AND TRADEMARK OFFICE
CERTIFICATE OF CORRECTION

PATENT NO. : 3,999,907
DATED : December 28, 1976
INVENTOR(S) : Constantine G. Pappas It is certified that error appears in the above-identified patent and that said Letters Patent are hereby corrected as shown below:

Column 4, line 25, insert "forming" after --tread--;

Column 5, line 54, after "tire" insert --tread--;

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*